(12) United States Patent
Lawrence

(10) Patent No.: US 11,551,412 B2
(45) Date of Patent: Jan. 10, 2023

(54) SYSTEMS AND METHODS FOR TRAVERSING IMPLIED SUBDIVISION HIERARCHICAL LEVEL OF DETAIL CONTENT

(71) Applicant: Cesium GS, Inc., Philadelphia, PA (US)

(72) Inventor: Joshua Lawrence, Media, PA (US)

(73) Assignee: CESIUM GS, INC., Philadelphia, PA (US)

(*) Notice: Subject to any disclaimer, the term of this patent is extended or adjusted under 35 U.S.C. 154(b) by 0 days.

(21) Appl. No.: 17/384,641

(22) Filed: Jul. 23, 2021

(65) Prior Publication Data
US 2022/0028161 A1 Jan. 27, 2022

Related U.S. Application Data

(60) Provisional application No. 63/055,994, filed on Jul. 24, 2020.

(51) Int. Cl.
| | | |
|---|---|---|
| G06T 17/00 | (2006.01) |
| G06T 15/20 | (2011.01) |
| G06T 3/40 | (2006.01) |

(52) U.S. Cl.
CPC .......... G06T 17/005 (2013.01); G06T 3/4092 (2013.01); G06T 15/20 (2013.01)

(58) Field of Classification Search
None
See application file for complete search history.

(56) References Cited

U.S. PATENT DOCUMENTS

| | | | | |
|---|---|---|---|---|
| 6,054,991 A | * | 4/2000 | Crane | G06T 15/10 |
| | | | | 345/420 |
| 2016/0203635 A1 | * | 7/2016 | Wyman | G06T 15/506 |
| | | | | 345/426 |
| 2016/0360104 A1 | * | 12/2016 | Zhang | B60R 1/00 |
| 2017/0329801 A1 | * | 11/2017 | Rohlf | G06T 17/05 |
| 2020/0118330 A1 | * | 4/2020 | Connelly | G06F 30/13 |
| 2020/0175766 A1 | * | 6/2020 | Gawrys | G06F 30/12 |

* cited by examiner

*Primary Examiner* — Aaron M Richer
(74) *Attorney, Agent, or Firm* — Tarbury Law Group, PLLC

(57) ABSTRACT

Systems, methods, devices, and non-transitory media of the various embodiments may include for traversing hierarchical level of detail (HLOD) content for rendering on a display of a client computing device. Various embodiments employ structured HLOD data structures for HLOD content, using the uniform dimensional aspects of the structured trees to generate object space representation of the HLOD content and a sampling construct for the HLOD content. The same sampling construct may be applied to an object space representation of the HLOD content for any level of the structured tree. In various embodiments, sampling using the sampling construct for an object space representation of the HLOD content may be based on a camera position relative to the object space representation of the HLOD content. Various embodiments include transforming camera frustrum planes to object space representation of the HLOD content and testing visibility of the HLOD content from the object space representation.

8 Claims, 18 Drawing Sheets

SYSTEMS AND METHODS FOR TRAVERSING IMPLIED SUBDIVISION HIERARCHICAL LEVEL OF DETAIL CONTENT

RELATED APPLICATIONS

This application claims priority to U.S. Provisional Application No. 63/055,994 entitled "Systems and Methods For Traversing Implied Subdivision Hierarchical Level of Detail Content" filed on Jul. 24, 2020, the entire contents of which are hereby incorporated by reference for all purposes.

BACKGROUND

Computer graphics processing, and especially three-dimensional (3D) visualization, is computationally complex and resource intensive. Hierarchical level of detail (HLOD) data structures for image content are employed in complex computer graphics rendering, such as in 3D computer graphics applications, for which data of different hierarchical levels of the HLOD data structures may be used for rendering computer graphics with varying levels of detail. HLOD data structures can be employed to reduce a total amount of data that needs to be rendered at any given time as well as to reduce aliasing compared with non-hierarchical computer graphics data.

HLOD data structures are typically configured as a tree of nodes. When bounding boxes of the nodes are unpredictable, visibility must be explicitly checked every time against a camera's frustum planes as well as other 3D operations like distance checks between the camera and bounding box to pull in the right level of detail. With explicit subdivision trees, data for each node is specified explicitly since the data cannot be derived.

SUMMARY

Systems, methods, devices, and non-transitory media of the various embodiments may include for traversing hierarchical level of detail (HLOD) content for rendering on a display of a client computing device. Various embodiments employ structured HLOD data structures for HLOD content, using the uniform dimensional aspects of the structured trees to generate object space representation of the HLOD content and a sampling construct for the HLOD content. The same sampling construct may be applied to an object space representation of the HLOD content for any level of the structured tree. In various embodiments, sampling using the sampling construct for an object space representation of the HLOD content may be based on a camera position relative to the object space representation of the HLOD content. Various embodiments include transforming camera frustrum planes to object space representation of the HLOD content and testing visibility of the HLOD content from the object space representation.

Various embodiments may include receiving a metadata structure indicating a structured tree of nodes of different levels of detail of the HLOD content, the metadate structure received over a network from a server, generating an object space representation of at least one level of the structured tree of nodes of the HLOD content based at least in part on the metadata structure, transforming a current camera sphere for a view of the HLOD content to be rendered into an object space to create a camera object space ellipsoid, determining nodes of the at least one level of the structured tree of nodes of the HLOD content required for rendering based on a comparison of the generated object space representation and the camera object space ellipsoid, and requesting data for the determined nodes of the at least one level of the structured tree of nodes of the HLOD content from the server.

Various embodiments may include determining a lower subtree of a structured tree of nodes of different levels of detail of the HLOD content needed for rendering, wherein the lower subtree level is greater than one lower level of detail removed from a current level of nodes available to the client computing device, requesting the lower subtree from the server without requesting intermediate subtrees, and receiving a dummy file in response to the lower subtree not existing at the server, the dummy file indicating the lower subtree does not yet exist at the server.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
FIG. 1 illustrates an example of an image data divided into a hierarchy by bounding boxes.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs. Computing devices may include more than one type of processor. For example, a computing device may include a central processing unit (CPU) and a graphics processing unit (GPU). A CPU typically includes a limited number of cores with relatively larger cache memory capability and is often configured to support serial processing tasks. A GPU typically includes many cores with limited cache memory and can handle processing of many threads, such as thousands of threads, in parallel. CPUs and GPUs often work together to handle processing operations, especially image rendering, such as image rendering enabled by 3D Digital Earth and GIS software.

Various embodiments include traversing of hierarchical level of detail (HLOD) image content for which a subdivision is predetermined. For example, predetermined subdivisions of HLOD content may include subdivisions of the HLOD content that have structures and/or parameters that are known to a computing device processing the HLOD content. For another example, the predetermined subdivisions of HLOD content may include subdivisions that have structures and/or parameters that are the same for each subdivision. Such, subdivisions of the HLOD content may be structured HLOD data structures, such as octrees or quadtrees. Using predetermined subdivisions of HLOD content may enable random access style of traversal of the HLOD content in circumstances where a typical unstructured HLOD data structure, such as tree of nodes structure having variable amounts of child nodes per parent node, is not required.

An example of where HLOD data structures are used is in three-dimensional (3D) computer graphics applications. Massive 3D models are often organized into HLOD data structures to greatly reduce the total amount of data that needs to be rendered at any given time as well as to reduce aliasing (e.g., too much information lying under a single pixel). A relative level of detail goes from low to high traversing from a root of an HLOD data structure to leaves of the HLOD data structure. A node in an HLOD data structure that represents a large 3D model will have data needed to render a portion of the 3D model for which the node is responsible. The use of HLOD data structures is useful because as more detail needs to be rendered for a given change in camera view, such as zooming in, only relevant portions of the 3D model need to be updated to increase detail of a rendering of the 3D model, such as by replacing what is no longer high enough detail.

In an example, as illustrated in FIG. 1, data of HLOD content 100, such as a massive point cloud, may be broken up into a hierarchy of chunks, illustrated by bounding boxes overlaying the HLOD content 100. The HLOD data structure typically used for traversing HLOD content 100 is an unstructured tree of nodes, where a parent node will have links to its child nodes so that traversal can continue exploring that part of the tree. When the bounding boxes of the nodes are unpredictable, visibility must be explicitly checked every time against a camera's frustum planes as well as other 3D operations like distances checks between the camera and bounding box to pull in a specified level of detail. The unstructured tree of nodes is also an explicit subdivision tree, for which the data for each node is specified explicitly since it can't be derived.

Embodiments herein subdivide the HLOD content predictably and homogeneously enabling traversal to be reformulated into a random access style without the need for an unstructured tree of nodes or explicit 3D operations for visibility and distance checks. Predictable and homogeneous subdivision of the HLOD content may be implemented using structured HLOD data structures. Such structured HLOD data structures may be structured trees, such as octrees or quadtrees, for which each parent node of the structured tree has the same amount of child nodes as any other parent node of the structured tree.

Use of structured HLOD data structures reduces tree structure complexity enabling smaller representations of the tree structure data in comparison to an unstructured tree of nodes. In general, the metadata about the structured tree structure of a structured HLOD data structure that is needed to traverse it and understand what portions of the HLOD content need to be pulled in may be a root node's bounding volume and geometric error and availability data about whether or not a node exists in the structured tree, e.g., has 3D content that can be used for rendering. From the root node's bounding volume and geometric error, a bounding volume and geometric error for every other node of the structured tree may be implied. For example, quadtrees and octrees are subdivided perfectly in half along each dimension as the levels of the structured tree are traversed from root node to end nodes. Availability data may be, for example, a set of structured subtrees (portions of the whole structured tree) where each structured subtree may be an array of packed bits where each bit maps to some node in the structured subtree and the bits indicate whether the node exists. For example, a bit value of "1" may indicate that a node exists. One of skill in the art will realize that other representations of whether a node exists in the structured subtree may be suitable for a context of an application and/or data.

Precomputed Camera Spheres

Normally in explicit subdivision trees, a level of detail (LOD) transition (replacing a parent node with its child nodes, or mixing a child node with its parent node) happens when a fixed threshold is passed. Inputs to this threshold test are a node's bounds and the render camera. This threshold test is derived from camera parameters such as screen aspect ratio and camera field of view as well as distance to the camera and geometric error for the node in question. The only variable that is dynamic is the node's distance from the camera, the rest are parameters set to defaults or explicitly set by the user and typically go unchanged for the lifetime of the application. Should any of them be changed by the user during runtime, a simple re-computation for the values is required.

Figure 2:
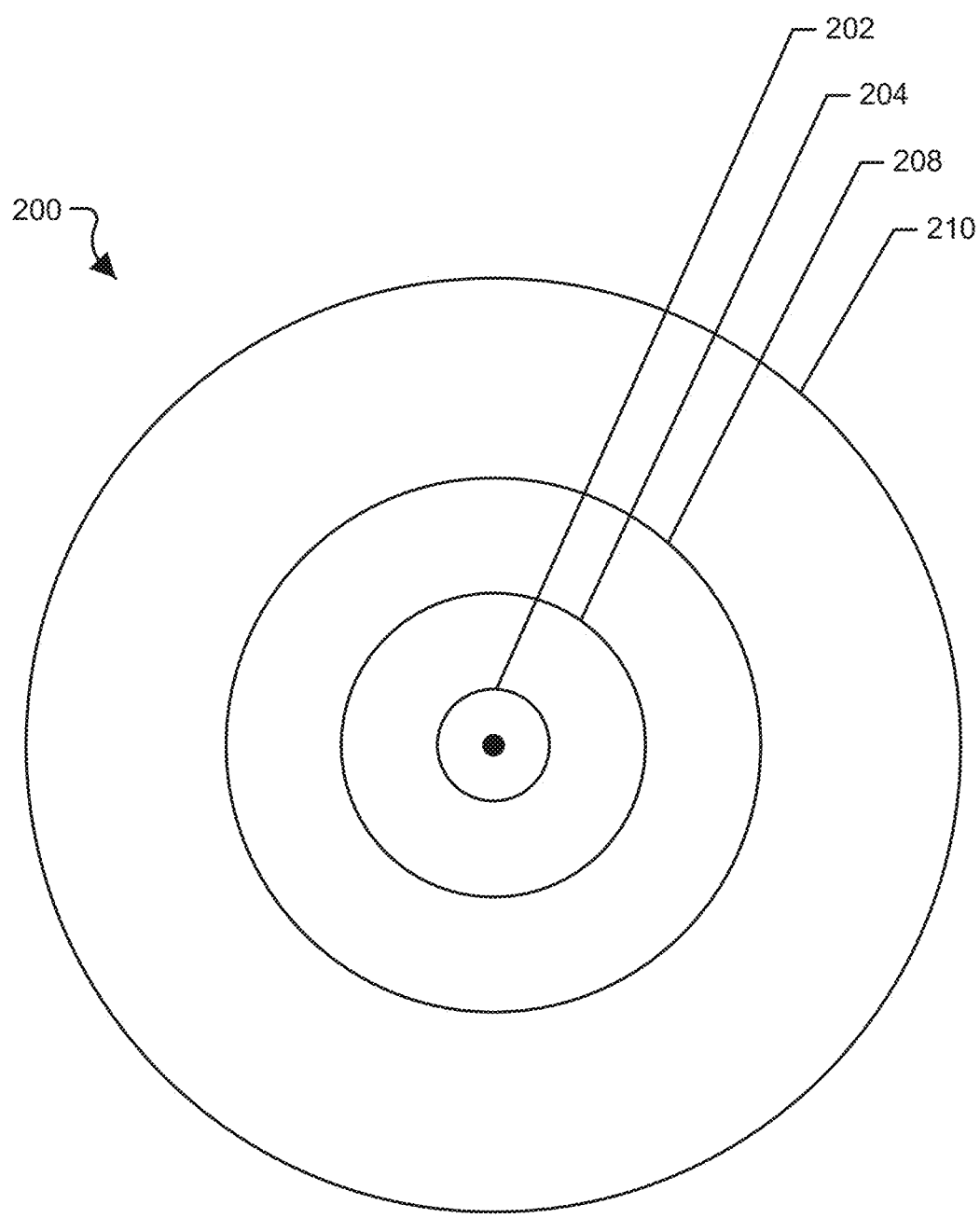
FIG. 2 is a schematic diagram illustrating example camera spheres according to various embodiments.

Embodiments implementing a structured HLOD data structure may have the same geometric error for every node at a specific level, and the threshold test may be recomposed in terms of a distance to a camera. FIG. 2 is a schematic diagram illustrating example camera spheres 200 according to various embodiments. An index position in a one-dimensional (1D) array may correspond to a level in a structured tree and a value held at that position in the array may a sphere radius from the camera position that a node must pass in order to be needed for rendering.

An implied subdivision, based on the sphere radius from the camera position, may enable an ability to precompute a distance from the root node. Distances of from nodes at other levels of the structured tree may be implied by a progressive division of 2. These distance values may be stored in a 1D array (where the index corresponds to the tree level) for easy lookup.

For example, given the camera parameters:
fieldOfViewY=1.047 radians
screenHeight: 512
sseDenominator=2.0*tan(0.5*fieldOfViewY)=1.1547
and a quadtree HLOD with a root that has:
root geometric error: 1024 levels: 4
geometric errors implied for each level: 1024, 512, 256, 128
maximumScreenSpaceError: 16
precomputed camera distances for each LOD transition may be calculated as:

$$distance=(geometricError*screenHeight)/$$
$$(maximumScreenSpaceError*sseDenominator)$$
$$distance=geometricError*27.7$$

The precomputed camera distance array may be:
[0]=28364.8
[1]=14182.4
[2]=7091.2
[3]=3545.6

A ratio of the distances between levels of the structured tree may be constant and determined by the ratio geometric error between levels of the structured tree. From the point of view of the camera, the ratios of the distances between levels of the structured tree can be thought of as set of spheres 200 centered on the camera's position where if a node on a level of the structured tree touches or falls inside the sphere 202, 204, 206, 208 corresponding to that level, the node may pass a screen space error test and may be potentially pulled in. Using this comparison of nodes to the ratios of the distances between levels of the structured tree, quick determination may be made about which levels may be accessible in the structured tree given a distance from the root bounds.

Infinite Virtual Grids and Array Space

Figure 3:
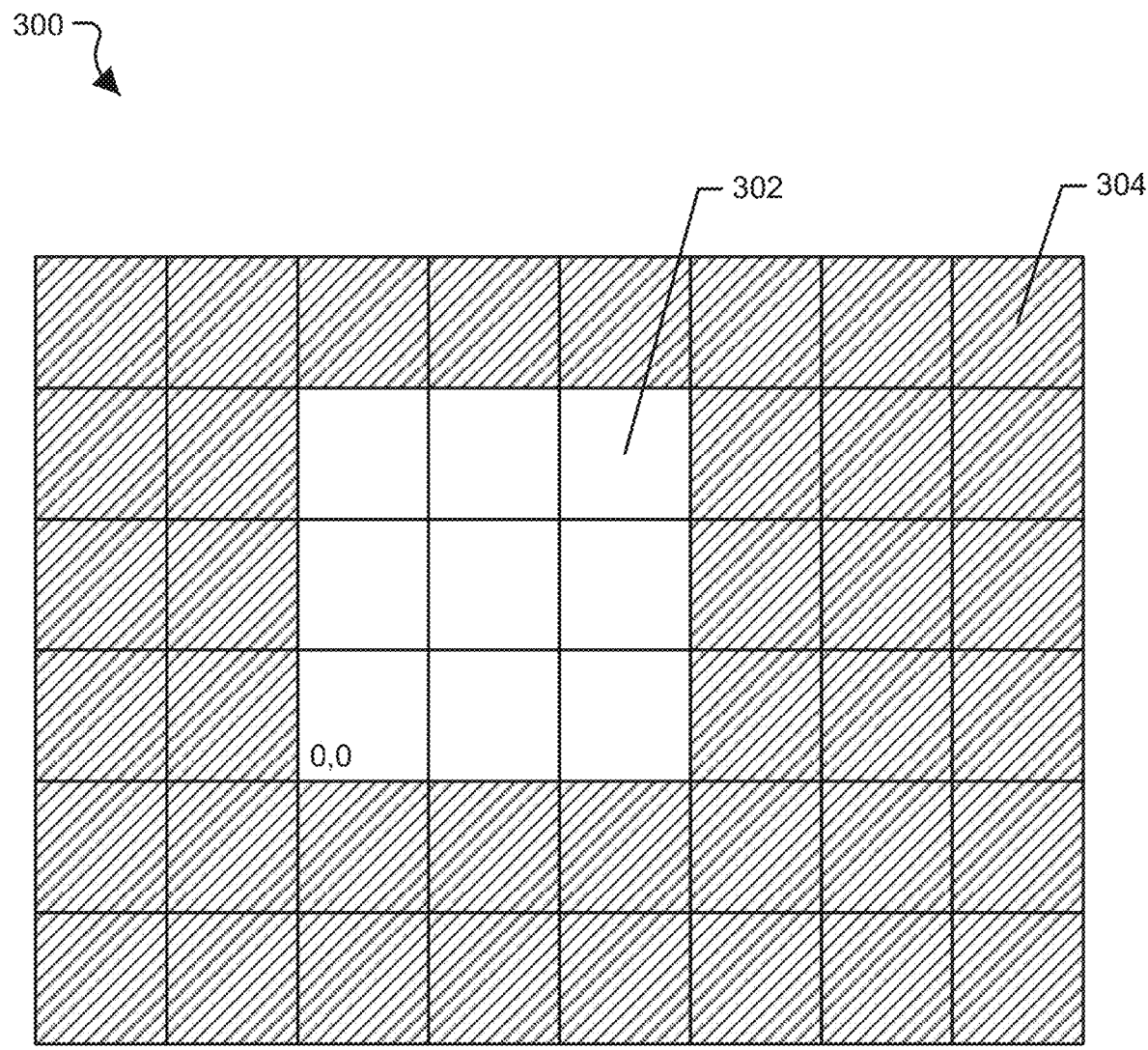
FIG. 3 is a schematic diagram illustrating an example virtual object space for image data according to various embodiments.

FIG. 3 is a schematic diagram illustrating an example virtual object space 300 for image data according to various embodiments. It would be convenient to transform traversal operations of the structured HLOD data structure, like a structured tree, by putting both interacting primitives in the same "space". For example, traversal operations of the structured HLOD data structure may be performed in a "virtual object space" 300, a neutral space where the primitive is centered at the origin and has no rotation or scaling applied, so that operations are agnostic to the particular bounds (scale), rotation, or translation of the structured tree. This would enable the results of a traversal to be easily queried against (or bit masked against) the results of other stages or node availability to get the final nodes that are important for a given camera view.

This virtual object space 300 may be modeled as an "array space" for embodiments in which an object 302 (illustrated in FIG. 3 by unshaded cells of the virtual object space 300) is a uniform grid. Each cell of the object 302 may have a uniform size, e.g., as size of 1, and a cell with an index (0,0,0) may be at an origin and may map directly on an array datastore. Every level of a structured tree, such as a quadtree or octree, when looked at independently from the rest of the structured tree, may be modeled as a fixed grid or an array. To get to this virtual object space 300, a transform would just be an inverse scale, position and rotation of a bounding box.

This array space 300 may be modeled like an infinite virtual grid. For example, if we transformed the camera position into the array space 300, it may map to a cell with negative indices and/or indices that lie outside of the bounds of the tree, e.g., cells 304 (illustrated in FIG. 3 by shaded cells of the virtual object space 300).

The format of the array space 300 may enable post processing of traversal data in one shot, for example, clamping a resulting set of indices down to the index bounds for a level of the structured tree. Or in more exotic cases, like a seamless tiled dataset (in the spirit of seamless textures) where the dataset is repeated in all directions, the resulting indices may be bit masked to get the actual indices (bit masking may be implemented instead of a more expensive modulo operator since the index range on each level is a power of 2).

This infinite virtual array space 300 may not store anything, rather simply being a space in which the traversal operations take place. The grid of the array space 300 may go on forever, e.g., extend in any direction for an indefinite number of cells, where the unshaded cells 302 may be in the bounds of where the dataset, e.g., the HLOD content, exists and the shaded cells 304 may be outside the bounds of the dataset.

Ellipsoid Sampling Skeleton

Figure 4A:
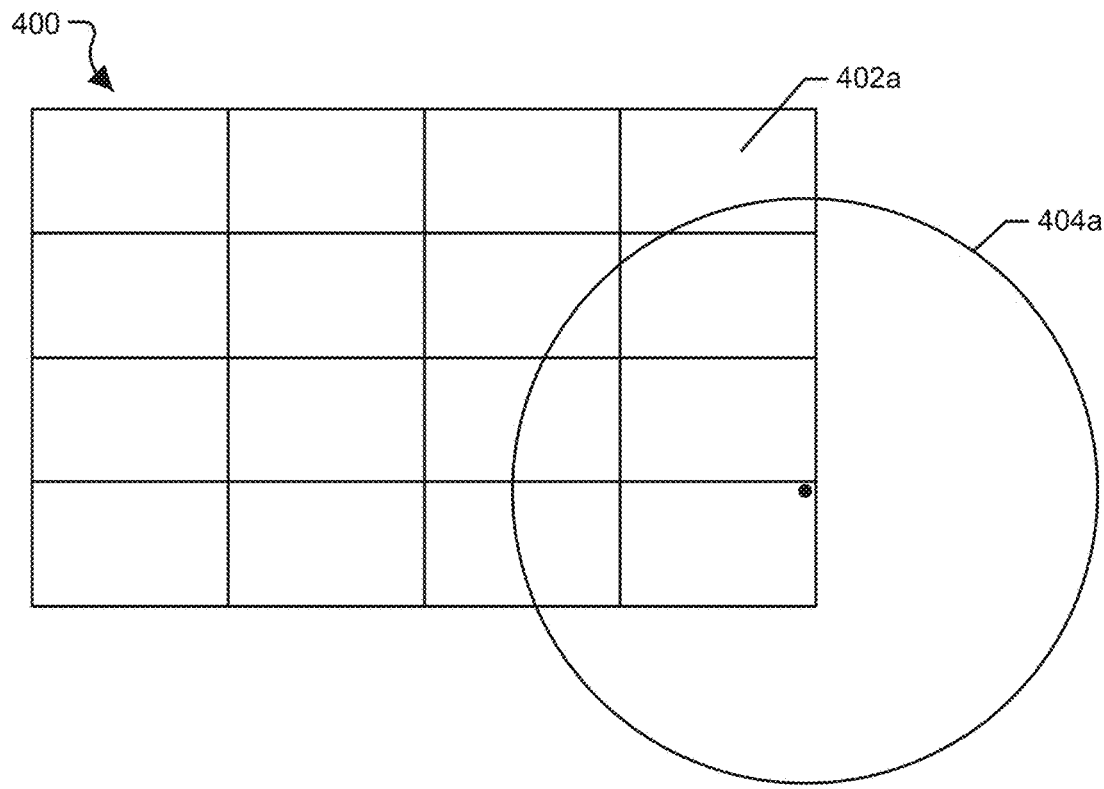
FIGS. 4A and 4B are schematic diagrams illustrating an example camera sphere, as in FIG. 2, in a virtual object space, as in FIG. 3, for generating a sampling skeleton according to various embodiments.
Figure 4B:
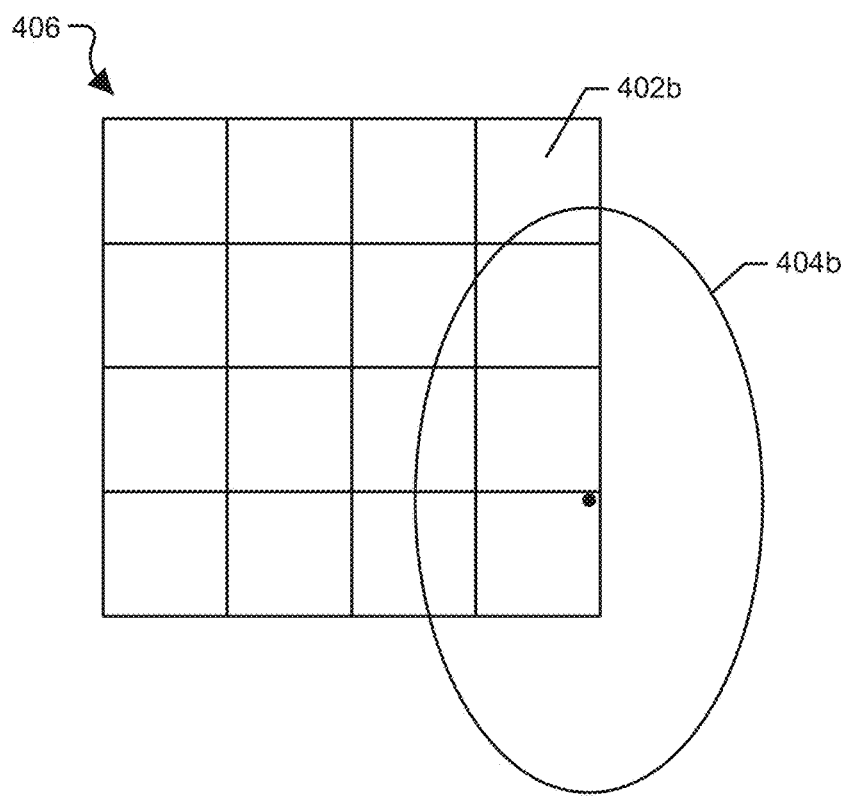

FIGS. 4A and 4B are schematic diagrams illustrating an example camera sphere 404*b*, as in FIG. 2 (e.g., sphere 202, 204, 206 208), in a virtual object space 406, as in FIG. 3 (e.g., virtual object space 300), for generating a sampling skeleton according to various embodiments. A range of indices in an object space 400 that a camera sphere 404*a* for a given level of a structured HLOD data structure, such as a structured tree, touches may be the same for every level of the structured tree. This uniformity may be a result of that a node's bounds and a sphere radius may be divided by the same factor at every successive level of the structured tree. A sampling skeleton for the sphere 404*a* in a virtual object space 406 may be precomputed instead of doing explicit bounds checks of the sphere 404*a* against each box 402*a*, or cell 402*a*, on the level in the object space 400. The skeleton may be precomputed for an array space 406 since the sphere's radius on a given level relative to the box's dimensions on that level are the same. As a result, 1 sampling skeleton in the array space 406 may be precomputed and may be usable for any level in the structured tree. Most of the time a cell's size for a given level in the object space 400 won't be the same in all directions. So when transforming the sphere 404a into the array space 406 having cells 402b with dimensions different from the cells 402a at the given level in the object space 400, such as cells 402b having equal dimensions in all directions, the sphere 404a may actually squish or stretch in some dimensions and form an ellipsoid 404b. If the cells 402a have dimensions that are the same in each direction the sphere 402a may remain a sphere 404b.

Figure 5:
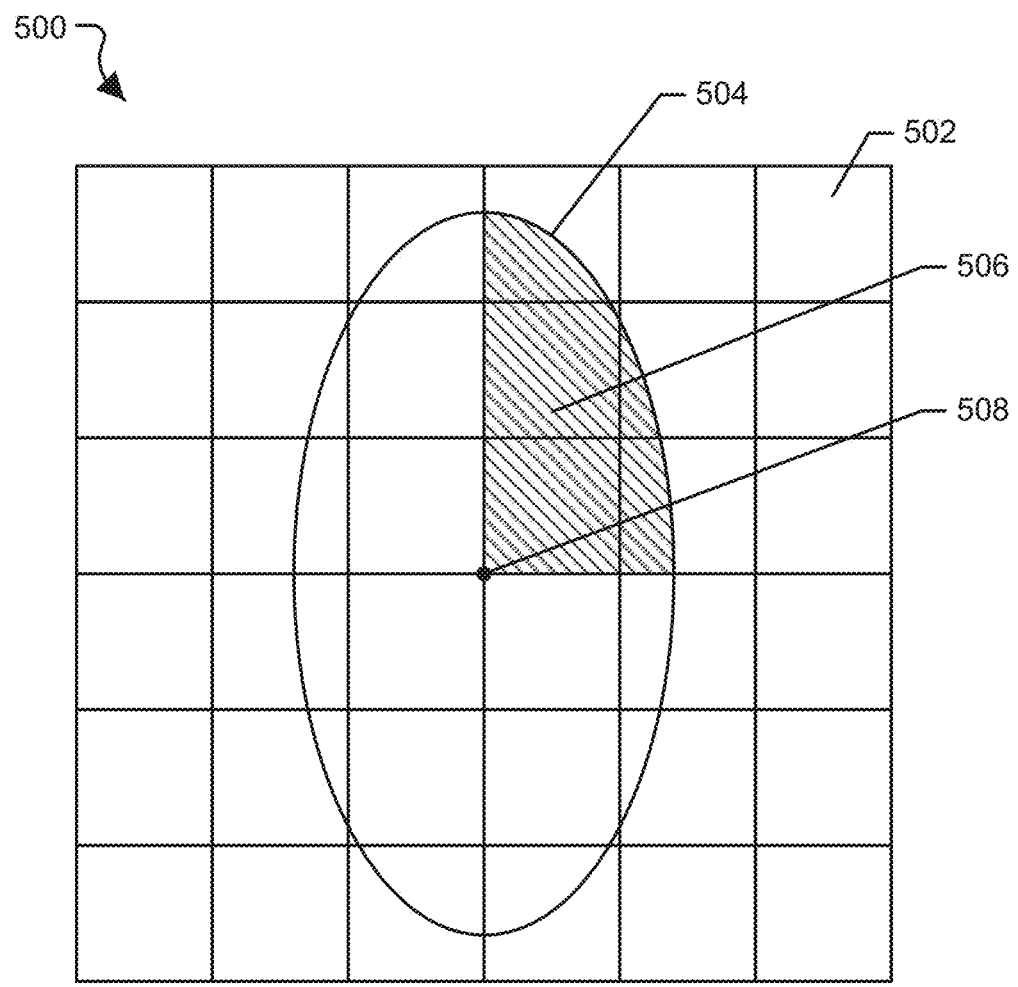
FIG. 5 is a schematic diagram illustrating example samples of a virtual object space, as in FIG. 3, using a sampling skeleton for a camera sphere, as in FIG. 4B, according to various embodiments.

FIGS. 5-7D are schematic diagrams illustrating example samples 506, 606,706a-706d of a virtual object space 500, 600, 700 (e.g., virtual object space 406 in FIG. 4B) using a sampling skeleton for the camera sphere 504, 604, 704 (e.g., camera sphere 406b in FIG. 4B) according to various embodiments. Since ellipsoids 504 (which include spheres) are symmetrical across axes, it may be sufficient to store samples 506 for one octant. The samples 506 in a positive octant (+x, +y, +z) may be stored and a sign bit may be used to indicate layer switches (e.g., if the samples 506 were stored in a 1D array). The samples 506, as illustrated in FIG. 5 by the shaded area, may include portions of cells 502, including some or all of a cell 502, where the camera sphere 504 intersects with the cells 502 of the one octant. Samples 506 may be taken at a higher resolution than the array, for example, every 0.5 step or even finer if more accuracy is desired. An unshaded area, as illustrated in FIG. 5, includes portions of cells 502, including some or all of a cell 502, which may be in the one octant and do not intersect with the camera sphere and cells 503 that are not in the one octant. In an example, at least some of the unshaded area may include cells that are mapped to the HLOD content.

At runtime, the camera position may be transformed to an array space 500 for a given level of a structured HLOD data structure, such as a structured tree, that the camera position may access. The array space camera position 508 and the samples 506 may be used to generate the indices (or a packed bit array) representing the cells 502 in the local bounds of the ellipsoid 504 in the infinite array space grid (e.g., array space 300 in FIG. 3) that the camera may need in order to satisfy screen space error on that level.

Figure 6:
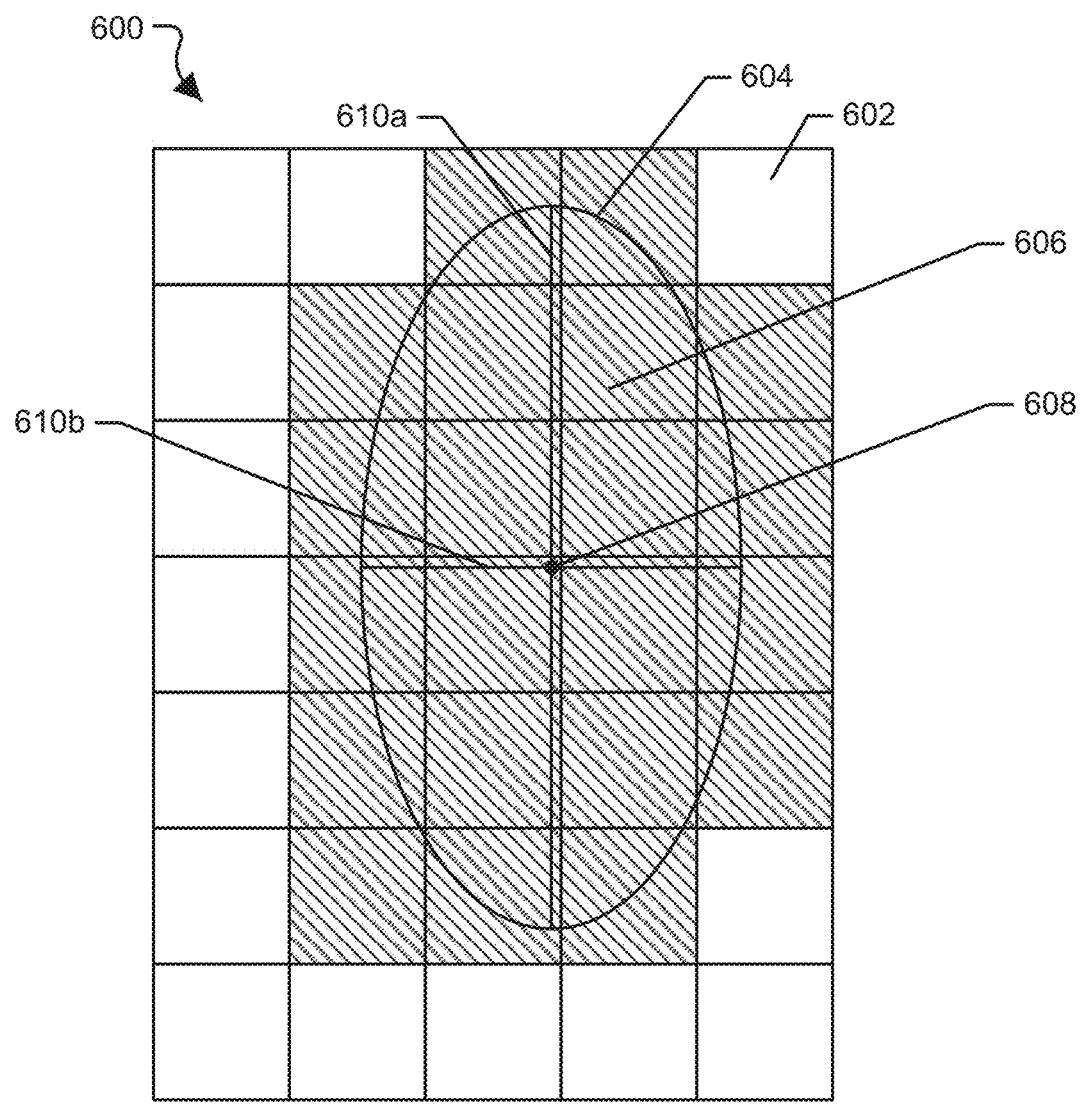
FIG. 6 is a schematic diagram illustrating example samples of a virtual object space, as in FIG. 3, using a sampling skeleton for a camera sphere, as in FIG. 4B, according to various embodiments.
Figure 7A:
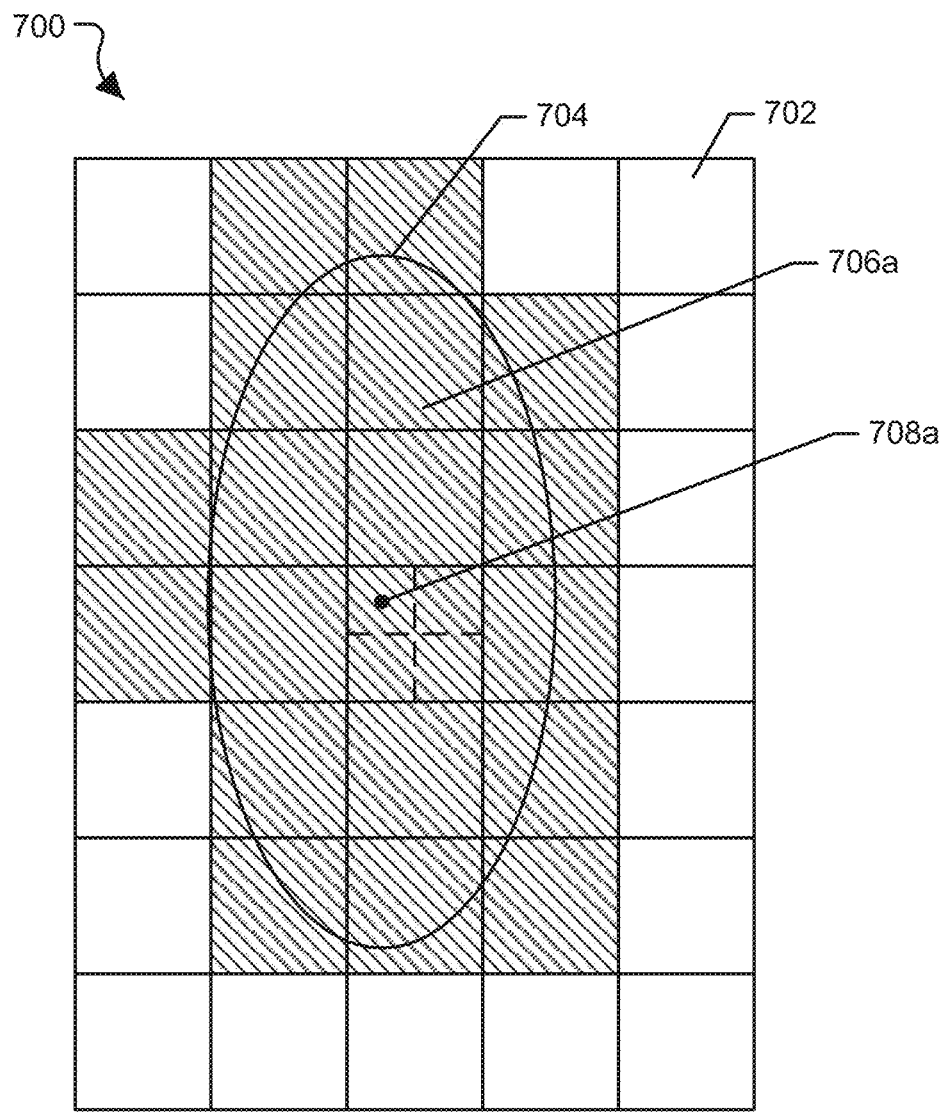
FIGS. 7A-7D are schematic diagrams illustrating example samples of a virtual object space, as in FIG. 3, using a sampling skeleton for a camera sphere, as in FIG. 4B, according to various embodiments.
Figure 7B:
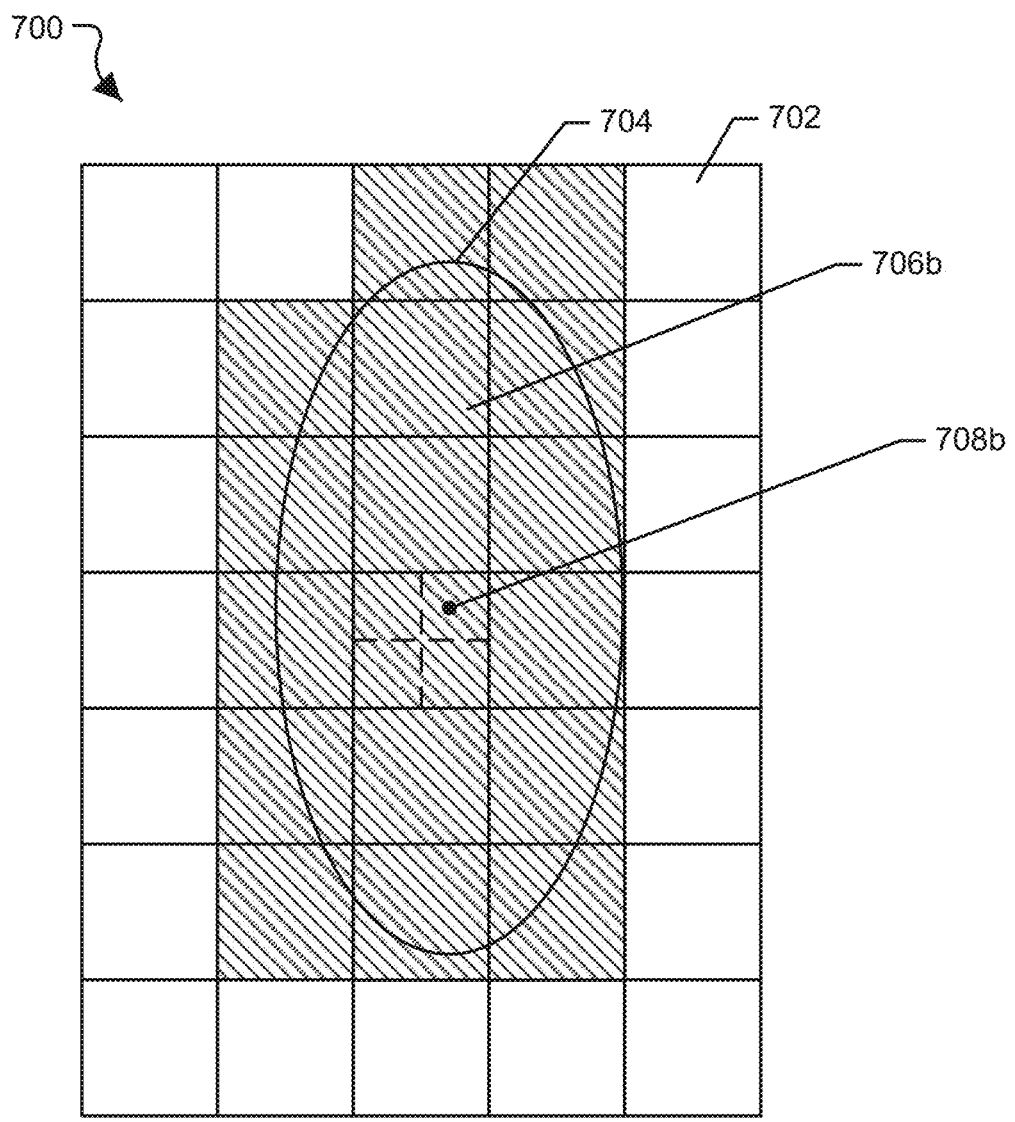
Figure 7C:
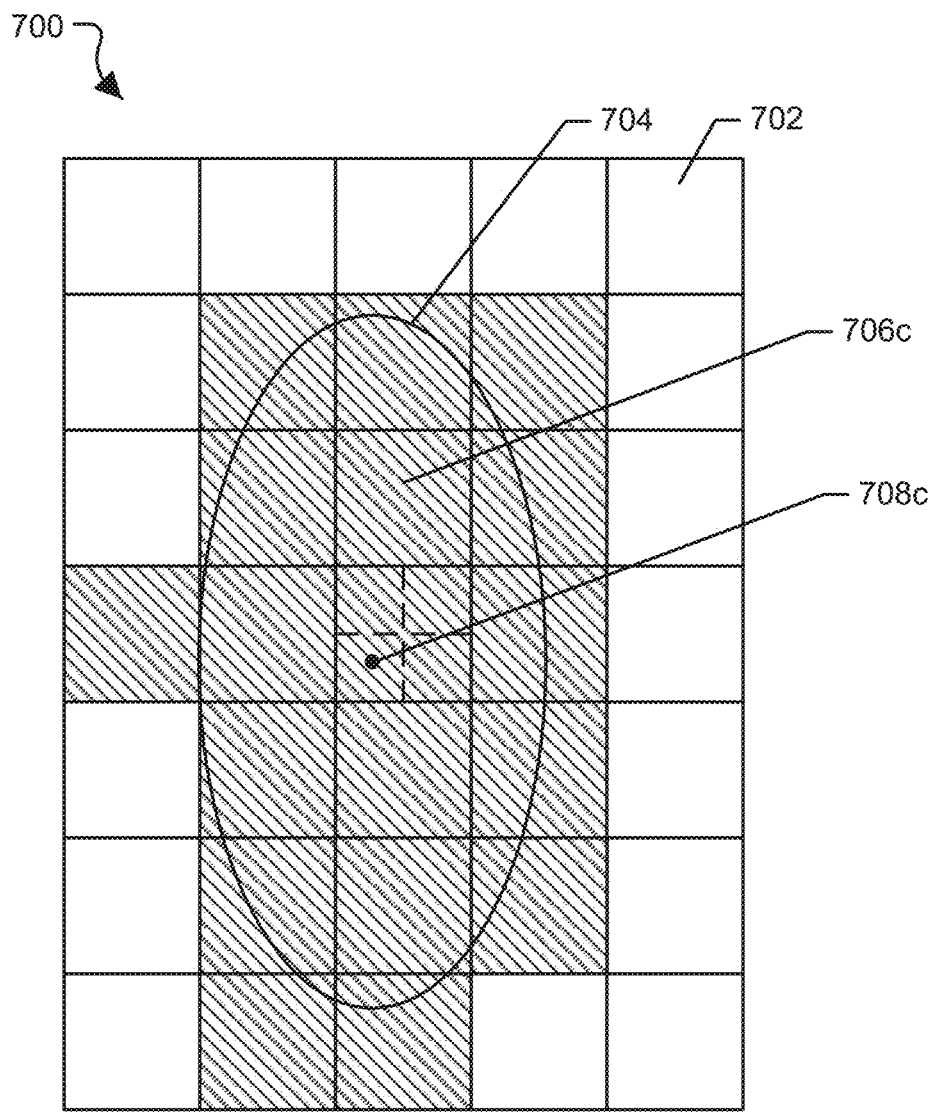
Figure 7D:
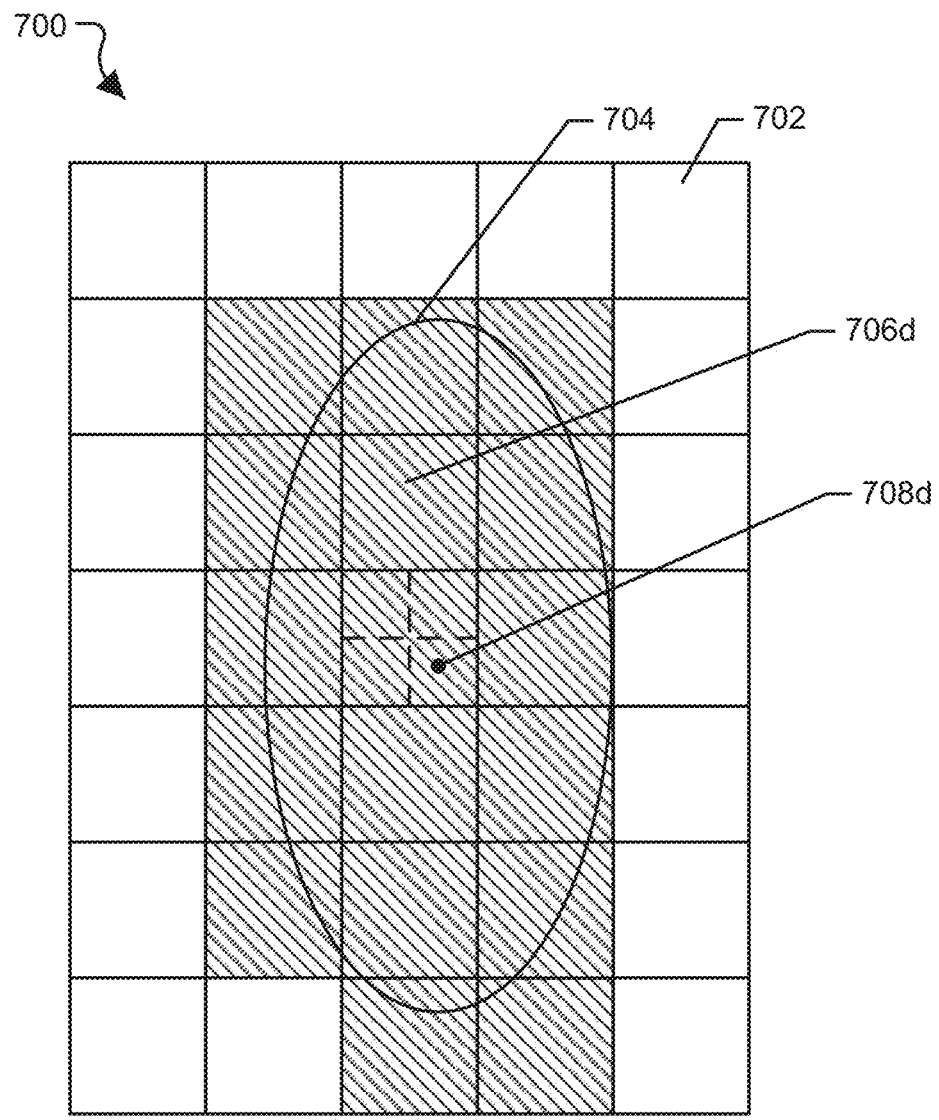

However, the foregoing embodiment may not be exact (e.g., in terms of accuracy of the sample 506 relative to the camera position 508), and an exact solution, as illustrated in FIG. 6, may recalculate the samples 606 (shown by the shaded area in FIG. 6) for every frame for the given camera position 608 in an array space 600, along the boundaries between cells 602 that touch the camera sphere 604 as well as the major axes 610a, 610b of the camera sphere 604.

A less accurate but more compressed embodiment of the sampling skeleton, as illustrated in FIGS. 7A-7D, may be a packed bit array where each bit corresponds to a cell 702 in the relative two-dimensional (2D) or 3D grid 706a-706d (illustrated in FIGS. 7A-7D by the shaded areas) that encases the array space transformed camera sphere 704 on the level. There may be several versions of the relative 2D or 3D grid 706a-706d stored for different positions in a cell 702 that the camera might occupy, such as the centroids 708a-708d of the 4 quadrants or 8 octants of the camera-relative origin cell. Then the cell quadrant or octant that the camera is closest to may be used. In an example, this embodiment may simply return a read-only reference to a precomputed packed bit array.

An approach to take for storage of the samples may be a packed bit array where each cell 502, 602,702 may correspond to a bit. The cells 502, 602,702 may be for a relative array space 3D grid centered around the ellipsoid sampling skeleton 504, 604, 704a-704d. The extents of this relative array space 3D grid may be the extents of the ellipsoid 504, 604, 704a-704d rounded up. The positive dimensions may need a plus 1. Bits may be flipped to a designated value, such as a high or "1" value, if they passed a test. In this example, the bits may be flipped to the designated value if the sampling ellipsoid 504, 604, 704a-704d touches them the corresponding cells.

Visibility

Figure 8:
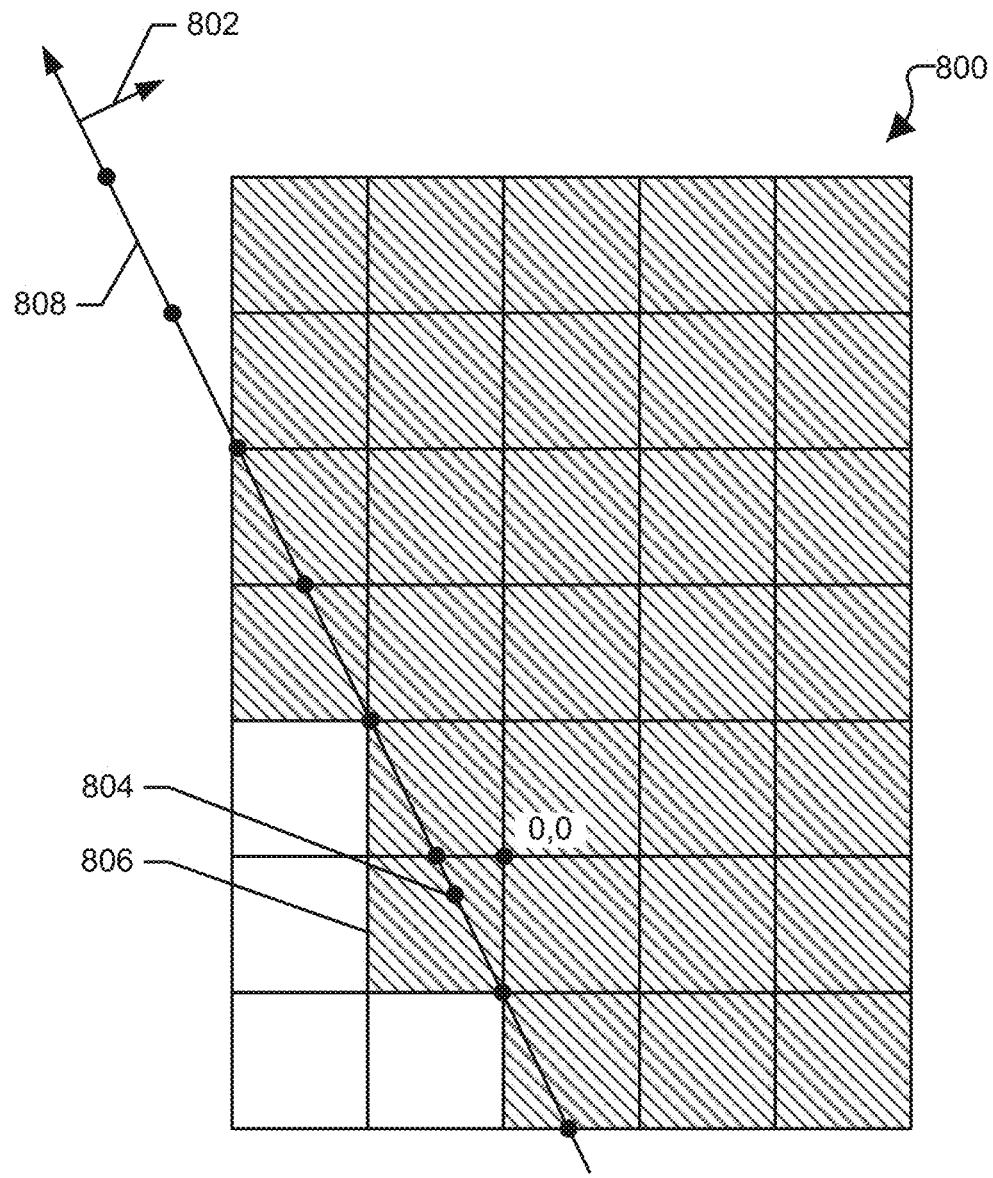
FIG. 8 is a schematic diagram illustrating an example virtual object space of a camera frustum plane according to various embodiments.

FIG. 8 is a schematic diagram illustrating an example virtual object space 800 of a camera frustum plane according to various embodiments. For visibility, frustum planes can be transformed into array spaces 800. The frustum plane's normal 802 scaled by the frustum plane's scalar distance from the origin may be a point 804 in the frustum plane. Subtracting the plane point 804 from a cell corner of a cell 806 and then taking the sign of a dot product of a resulting vector with the frustum plane normal 802 may indicate if the corner is in front of or behind the frustum plane. This process for generating data from which it may be determined whether a cell corner is in front of behind the frustum plane may be implemented for all the corners of all the cells in the relative 3D array space grid 800 that encases the camera sphere (e.g., camera sphere 404b, 504, 604, 704 in FIGS. 4B-7D) (e.g., illustrated in FIG. 8 by the shaded area). However, the cell 806 where the transition of "in-front" to "behind" happens may be identified for each row by modeling the plane as a line 808 that cuts through the array space and marching along this line 808 instead. More efficient line rendering algorithms can be used here, like Bresenham's line drawing algorithm or DDA line drawing algorithm.

When testing visibility of a cell 806 the corner that is closest to the plane may be checked. This corner may be found directly from the plane normal 802 by taking the inverse of the signs of each component. For example, in a 2D case, if a normal 802 is facing right and up (+x and +y) the bottom left corners of all the cells 806 (e.g., modeled as −x and −y relative to the cell center) may be tested.

If the frustum's plane normals 802 face the interior of the frustum, positive distances may count as visible. Previously positive tested cells 806 may be marked with a negative test for progressive tests of each plane to indicate that the cell 806 was completely culled by at least one plane and therefore not visible at all. It may be unnecessary to save the distances, rather ORing the sign bit into a packed bit array (or whatever storage method that is being used) for the bit corresponding to the cell 806. After all planes are tested, any bit that is a designated value, such as "0", may be visible (no negative test results), i.e., some portion inside the frustum. Flipping the bits of the final visibility result may make it easier to combine results of other steps (e.g., if visibility tests are being done separately on different threads) in an AND operation, meaning any bit left as a designated value, such as "1", may indicate that the cell 806 is visible, available, and satisfies screen space error.

Availability Skipping

Massive datasets usually require the availability information to be split up because it is too large to consume all at once. If this availability information is split up at fixed/predictable locations in the structured HLOD data structure, such as a structured tree, for example, as every subtree spanning 10 levels, what subtrees may be needed to finalize traversal results where the availability isn't resident yet may be identified. For example, the combined results from screen space error check and visibility may not yet have the availability subtree; what subtrees those partial traversal results touch may be identified and those subtrees that are several subtree levels deeper that than the ones currently obtained may be requested (as opposed to going subtree by subtree, down the structured tree). In networked scenarios this may generate a lot of 404 errors since the subtree may not exist. One way around this may be to symlink to a dummy file for every non-existent subtree in the dataset. However, availability subtree skipping may be used for full, non-sparse datasets.

Figure 9:
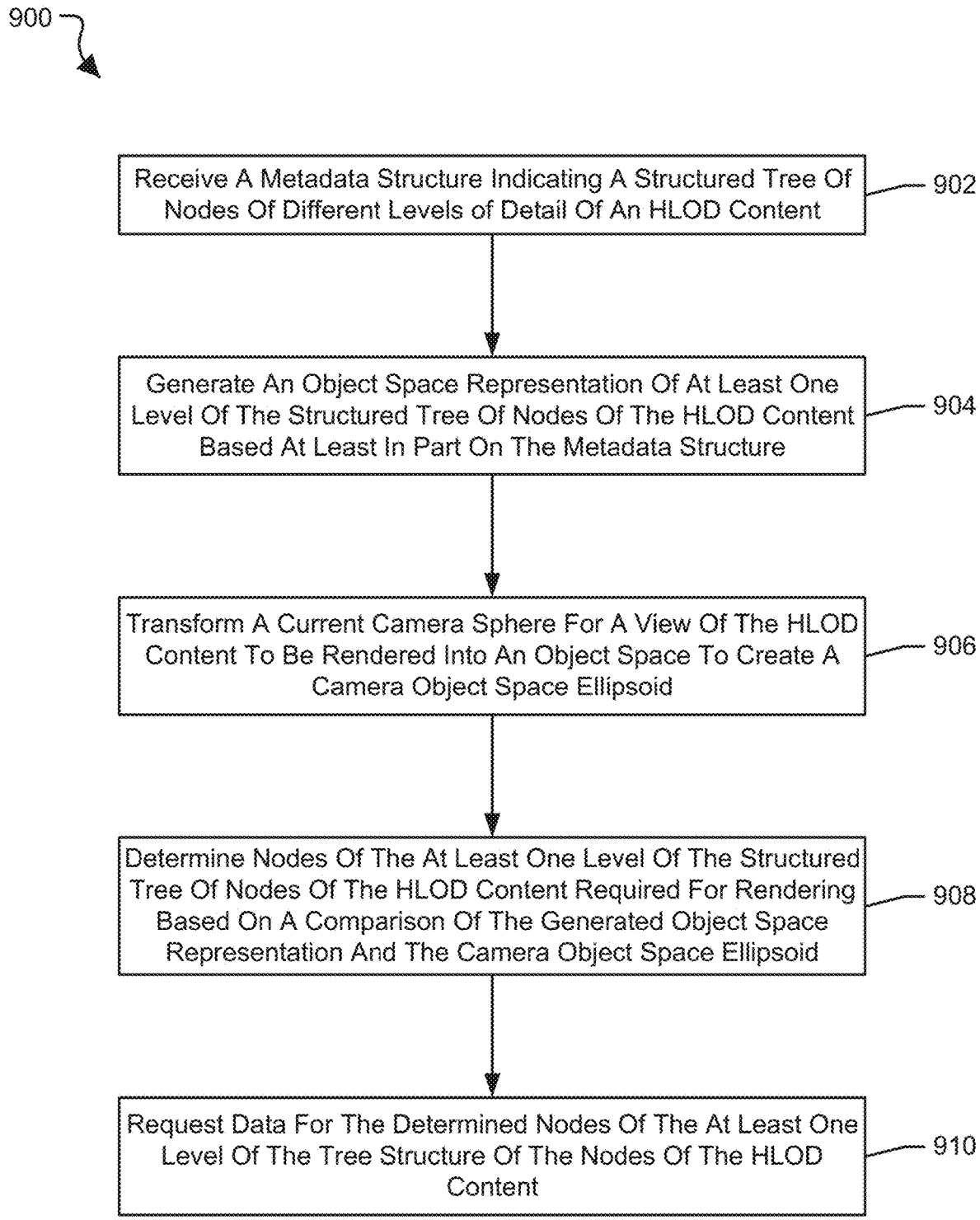
FIG. 9 is a processes flow diagram illustrating an example method of traversing hierarchical level of detail (HLOD) content according to various embodiments.

FIG. 9 is a processes flow diagram illustrating an example method 900 of traversing HLOD content according to various embodiments. In various embodiments, the operations of method 900 may be performed by one or more component of a computing device individually and/or working together, such as a CPU, a GPU, etc.

In block 902, the component of the computing device (e.g., the CPU and/or the GPU) may receive a metadata structure indicating a structured HLOD data structure, e.g., a structured tree of nodes of different levels of detail of an HLOD content. In various embodiments, the metadata structure may be received over a network from a server. In various embodiments, the metadata structure may include a root node's bounding volume and geometric error and availability data about whether or not a node exists in the structured tree, e.g., has 3D content that can be used for rendering. In various embodiments, the structured tree may be a quadtree or octree.

In block 904, the component of the computing device (e.g., the CPU and/or the GPU) may generate an object space representation (e.g., virtual object space 300, 406, 500, 600, 700 in FIGS. 3, 4b, and 5-7D) of at least one level of the structured tree of nodes of the HLOD content based at least in part on the metadata structure. The object space representation may be modeled as an "array space" for embodiments in which an object (e.g., object 302 in FIG. 3) is a uniform grid. Each cell of the object may have a uniform size, e.g., as size of 1, and a cell with an index (0,0,0) may be at an origin and may map directly on an array datastore. Every level of a structured tree, when looked at independently from the rest of the structured tree, may be modeled as a fixed grid or an array. To get to this object space representation, a transform would just be an inverse scale, position and rotation of a bounding box. This object space representation may be modeled like an infinite virtual grid.

In block 906, the component of the computing device (e.g., the CPU and/or the GPU) may transform a current camera sphere (e.g., camera sphere 202, 204, 206, 208, 404a in FIGS. 2 and 4A) for a view of the HLOD content to be rendered into an object space (e.g., object space 400 in FIG. 4A) to create a camera object space ellipsoid (e.g., ellipsoid 404b, 504, 604, 704 in FIGS. 4B-7D). Most of the time a size of the cells (e.g., 402a in FIG. 4A) for a given level won't be the same in all directions. So when transforming the sphere into the array space having cells (e.g., cell 302, 402b, 502, 602, 702 in FIGS. 3, 4B, and 5-7D) with dimensions different from the cells at the given level, the sphere may actually squish or stretch in some dimensions and form the ellipsoid. If the cells of the given level have dimensions that are the same in each direction the sphere may remain a sphere when transformed to an ellipsoid. In some embodiments, the current camera sphere, or the camera position, may be transformed to the camera object space ellipsoid at runtime.

In block 908, the component of the computing device (e.g., the CPU and/or the GPU) may determine nodes of the at least one level of the structured tree of nodes of the HLOD content required for rendering based on a comparison of the generated object space representation and the camera object space ellipsoid. For example, nodes may include portions of cells, including some or all of a cell, where the camera object space ellipsoid intersects with the cells. Further, since ellipsoids are symmetrical across axes, it may be sufficient to samples nodes for one octant. The samples (e.g., sample 506 in FIG. 5) in a positive octant (+x, +y, +z) may be stored and a sign bit may be used to indicate layer switches (e.g., if the samples were stored in a 1D array). Samples may be taken at a higher resolution than the array, for example, every 0.5 step or even finer if more accuracy is desired. Other examples are described further herein for methods 1000, 1100 with reference to FIGS. 10 and 11.

In block 910, the component of the computing device (e.g., the CPU and/or the GPU) may request data for the determined nodes of the at least one level of the structured tree of nodes of the HLOD content. In various embodiments, the data for the determined nodes may be requested over the network from the server.

Figure 10:
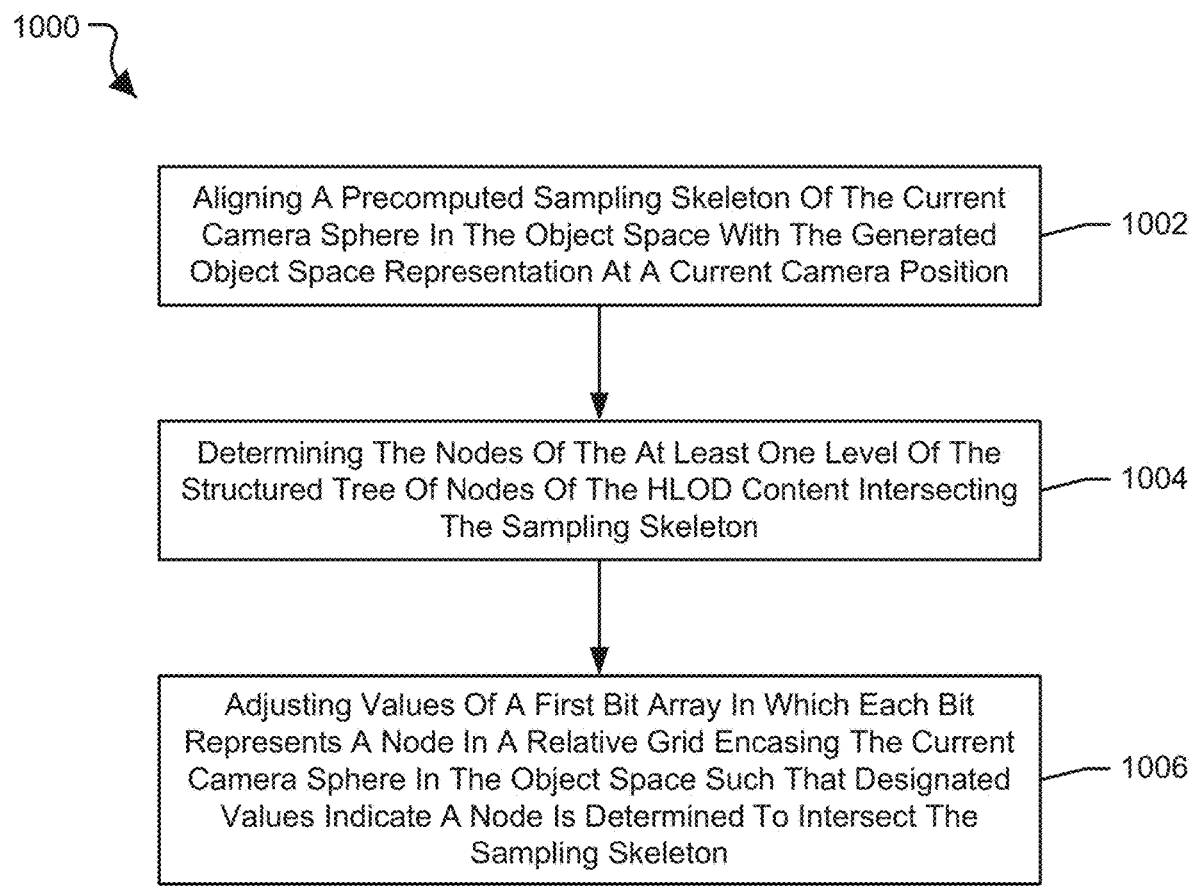
FIG. 10 is a processes flow diagram illustrating an example method of traversing HLOD content according to various embodiments.

FIG. 10 is a processes flow diagram illustrating an example method 1000 of traversing HLOD content according to various embodiments. In various embodiments, the operations of method 1000 may be performed by one or more component of a computing device individually and/or working together, such as a CPU, a GPU, etc. The operations of method 1000 may further describe the operations described herein of block 908 of the method 900 with reference to FIG. 9.

In block 1002, the component of the computing device (e.g., the CPU and/or the GPU) may align a precomputed sampling skeleton of the current camera sphere (e.g., camera sphere 202, 204, 206, 208, 404a in FIGS. 2 and 4A) in the object space (e.g., object space 400 in FIG. 4A) with the generated object space representation (e.g., object space 300, 406, 500, 600, 700 in FIGS. 3, 4b, and 5-7D) at a current camera position (e.g., camera position 508, 608, 708a-708d in FIGS. 5-7D). In various embodiments, the precomputed sampling skeleton may be a portion of the camera object space ellipsoid (e.g., ellipsoid 404b, 504, 604, 704 in FIGS. 4B-7D), including all of the camera object space ellipsoid.

In block 1004, the component of the computing device (e.g., the CPU and/or the GPU) may determine the nodes of the at least one level of the structured tree of nodes of the HLOD content intersecting the sampling skeleton. In various embodiments, the nodes may include portions of cells (e.g., cell 302, 402b, 502, 602, 702 in FIGS. 3, 4B, and 5-7D) of the generated object space representation, including some or all of a cell, where the camera object space ellipsoid intersects with the cells.

In block 1006, the component of the computing device (e.g., the CPU and/or the GPU) may adjust values of a first bit array in which each bit represents a node in a relative grid encasing the current camera sphere in the object space such that designated values indicate a node is determined to intersect the sampling skeleton. Samples (e.g., samples 606 in FIG. 6) may be recalculated for every frame for the current camera position in an generated object space representation, along the boundaries between cells that touch the camera object space ellipsoid as well as the major axes (e.g., major axes 610a, 610b in FIG. 6) of the camera object space ellipsoid. The current camera position and the portions of cells intersecting the camera object space ellipsoid may be used to generate indices (or a packed bit array) representing the cells in the local bounds of the camera object space ellipsoid in the generated object space representation. An approach to take for storage may be a packed bit array where each cell corresponds to a bit. The cells may be for a relative generated object space representation 3D grid centered around the camera object space ellipsoid sampling skeleton. The extents of this relative generated object space representation 3D grid may be the extents of the camera object space ellipsoid rounded up. The positive dimensions may need a plus 1. Bits may be flipped to a designated value, such as a high or "1" value, if they passed a test. In this example, the bits may be flipped to the designated value if the camera object space ellipsoid touches the corresponding cells.

Figure 11:
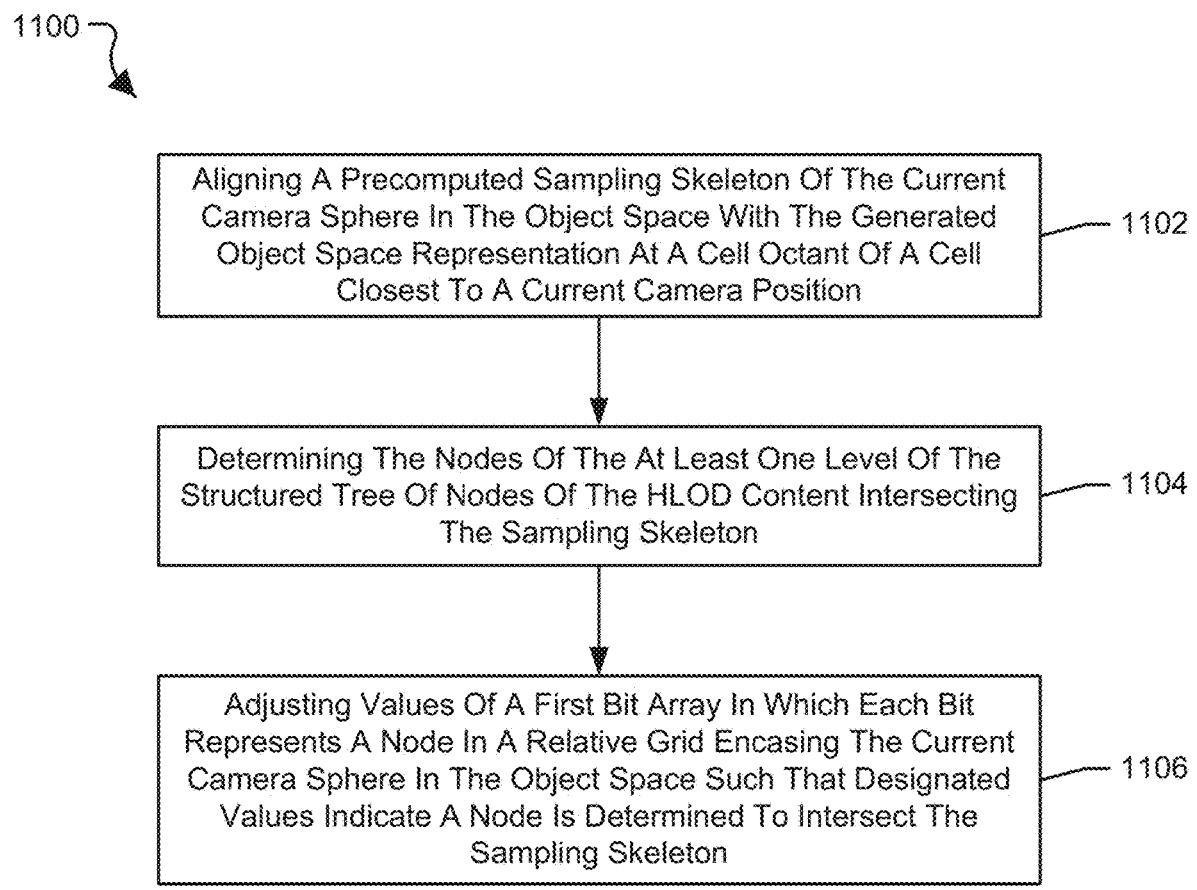
FIG. 11 is a processes flow diagram illustrating an example method of traversing HLOD content according to various embodiments.

FIG. 11 is a processes flow diagram illustrating an example method 1100 of traversing HLOD content according to various embodiments. In various embodiments, the operations of method 1100 may be performed by one or more component of a computing device individually and/or working together, such as a CPU, a GPU, etc. The operations of method 1100 may further describe the operations described herein of block 908 of the method 900 with reference to FIG. 9.

In block 1102, the component of the computing device (e.g., the CPU and/or the GPU) may align a precomputed sampling skeleton of the current camera sphere (e.g., camera sphere 202, 204, 206, 208, 404a in FIGS. 2 and 4A) in the object space (e.g., object space 400 in FIG. 4A) with the generated object space representation (e.g., object space 300, 406, 500, 600, 700 in FIGS. 3, 4b, and 5-7D) at a cell octant of a cell e.g., cell 302, 402b, 502, 602, 702 in FIGS. 3, 4B, and 5-7D) closest to a current camera position (e.g., camera position 508, 608, 708a-708d in FIGS. 5-7D). In various embodiments, the precomputed sampling skeleton may be a portion of the camera object space ellipsoid, including all of the camera object space ellipsoid. There may be several versions of a relative generated object space representation 2D or 3D grid stored for different positions in a cell that the camera might occupy, such as the centroids (e.g., centroids 708a-708d in FIGS. 7A-7D) of the 4 quadrants or 8 octants of a camera-relative origin cell. Then the cell quadrant or octant that the camera is closest to may be used.

In block 1104, the component of the computing device (e.g., the CPU and/or the GPU) may determine the nodes of the at least one level of the structured tree of nodes of the HLOD content intersecting the sampling skeleton. In various embodiments, the nodes may include portions of cells (e.g., cell 302, 402b, 502, 602, 702 in FIGS. 3, 4B, and 5-7D) of the generated object space representation, including some or all of a cell, where the camera object space ellipsoid intersects with the cells.

In block 1106, the component of the computing device (e.g., the CPU and/or the GPU) may adjust values of a first bit array in which each bit represents a node in a relative grid encasing the current camera sphere in the object space such that designated values indicate a node is determined to intersect the sampling skeleton. The current camera position and the portions of cells intersecting the camera object space ellipsoid may be used to generate indices (or a packed bit array) representing the cells in the local bounds of the camera object space ellipsoid in the generated object space representation. An approach to take for storage may be a packed bit array where each cell corresponds to a bit. The cells may be for a relative generated object space representation 3D grid centered around the camera object space ellipsoid sampling skeleton. The extents of this relative generated object space representation 3D grid may be the extents of the camera object space ellipsoid rounded up. The positive dimensions may need a plus 1. Bits may be flipped to a designated value, such as a high or "1" value, if they passed a test. In this example, the bits may be flipped to the designated value if the camera object space ellipsoid touches the corresponding cells.

Figure 12:
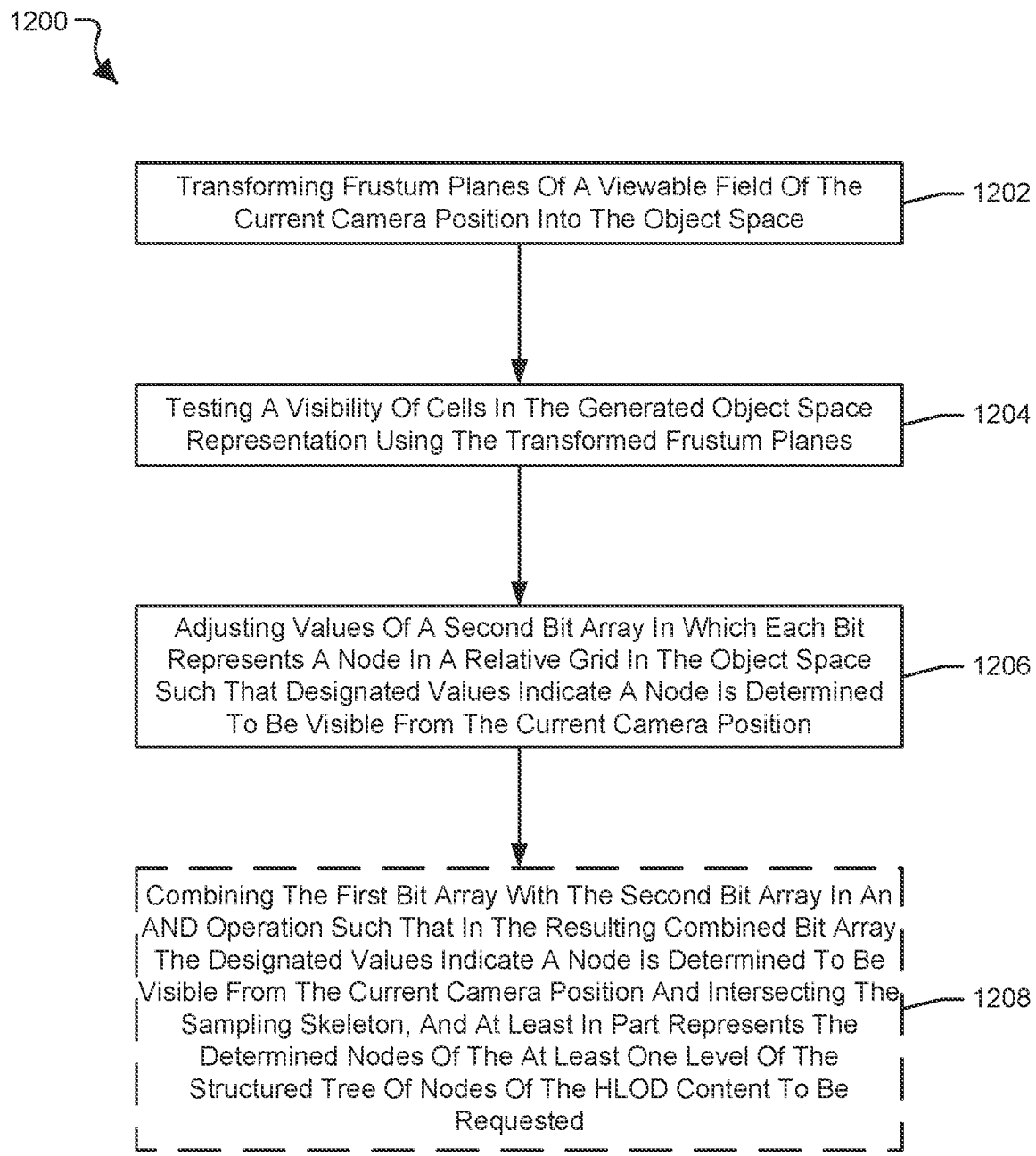
FIG. 12 is a processes flow diagram illustrating an example method of traversing HLOD content according to various embodiments.

FIG. 12 is a processes flow diagram illustrating an example method 1200 of traversing HLOD content according to various embodiments. In various embodiments, the operations of method 1200 may be performed by one or more component of a computing device individually and/or working together, such as a CPU, a GPU, etc. The operations of method 1200 may further describe the operations described herein of block 908 of the method 900 with reference to FIG. 9, the operations described herein of block 1004 of the method 1000 with reference to FIG. 10, and/or the operations described herein of block 1104 of the method 1100 with reference to FIG. 11.

In block 1202, the component of the computing device (e.g., the CPU and/or the GPU) may transform frustum planes of a viewable field of the current camera position into the object space (e.g., object space 400 in FIG. 4A). For testing visibility of a node of HLOD content from a camera position, frustum planes can be transformed into a generated object space representation (e.g., array space 800 in FIG. 8).

In block 1204, the component of the computing device (e.g., the CPU and/or the GPU) may test a visibility of cells (e.g., cell 806 in FIG. 8) in the generated object space representation using the transformed frustum planes. The frustum plane's normal (e.g., normal 802 in FIG. 8) scaled by the frustum plane's scalar distance from the origin may be a point (e.g., point 804 in FIG. 8) in the frustum plane. Subtracting the plane point from a cell corner of a cell and then taking the sign of a dot product of a resulting vector with the frustum plane normal may indicate if the corner is in front of or behind the frustum plane. This process for generating data from which it may be determined whether a cell corner is in front of behind the frustum plane may be implemented for all the corners of all the cells in the generated object space representation that encases the camera sphere (e.g., camera sphere 404b, 504, 604, 704 in FIGS. 4B-7D). In some embodiments, the cell where the transition of "in-front" to "behind" happens may be identified for each row by modeling the plane as a line (e.g., line 808) that cuts through the generated object space representation and marching along this line instead. When testing visibility of a cell the corner that is closest to the plane may be checked. This corner may be found directly from the plane normal by taking the inverse of the signs of each component.

In block 1206, the component of the computing device (e.g., the CPU and/or the GPU) may adjust values of a second bit array in which each bit represents a node in a relative grid in the object space such that designated values indicate a node is determined to be visible from the current camera position. If the frustum's plane normals face the interior of the frustum, positive distances may count as visible, and corresponding bits may be set to a designated value, such as a high or "1" value. Previously positive tested cells may be marked with a negative test for progressive tests of each plane to indicate that the cell was completely culled by at least one plane and therefore not visible at all, and corresponding bits may be set to a designated value, such as a low or "0" value. It may be unnecessary to save the distances, rather ORing the sign bit into a packed bit array (or whatever storage method that is being used) for the bit corresponding to the cell.

Figure 13:
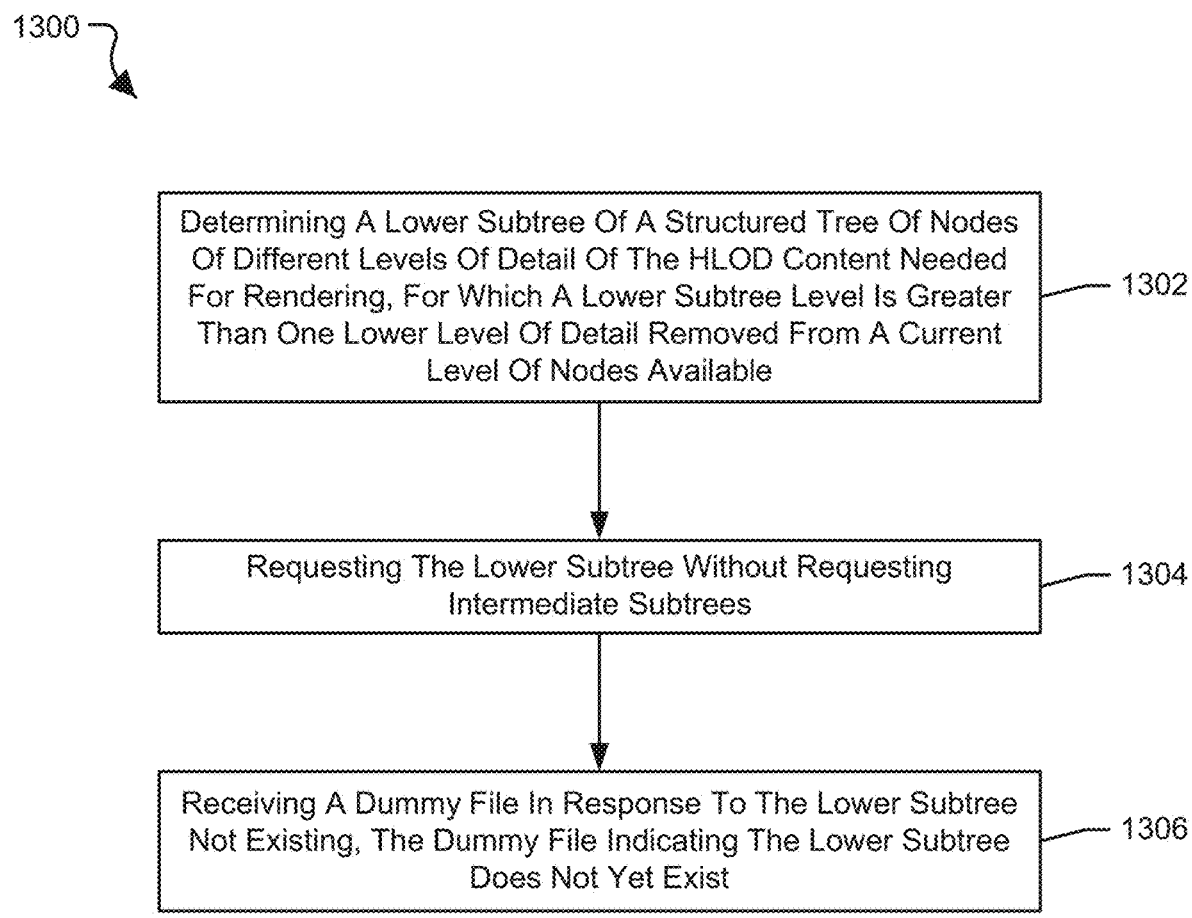
FIG. 13 is a processes flow diagram illustrating an example method of traversing HLOD content according to various embodiments.

In optional block 1208, the component of the computing device (e.g., the CPU and/or the GPU) may combine a first bit array with a second bit array in an AND operation such that in the resulting combined bit array the designated values indicate a node is determined to be visible from the current camera position and intersecting the sampling skeleton. After all planes are tested, any bit that is a designated value, such as "0", may be visible (no negative test results), i.e., some portion inside the frustum. Flipping the bits of the final visibility result may make it easier to combine results of other steps (e.g., if visibility tests are being done separately on different threads) in an AND operation, meaning any bit left as a designated value, such as a high or "1" value, may indicate that the cell is visible, available, and satisfies screen space error. In some embodiments, the combined bit array at least in part may represent the determined nodes of the at least one level of the structured tree of nodes of the HLOD content to be requested. In some embodiments, the nodes of the at least one level of the structured tree of nodes of the HLOD content to be requested may be request from a from the server via a network FIG. 13 is a processes flow diagram illustrating an example method 1300 of traversing HLOD content according to various embodiments. In various embodiments, the operations of method 1300 may be performed by one or more component of a computing device individually and/or working together, such as a CPU, a GPU, etc.

In block 1302, the component of the computing device (e.g., the CPU and/or the GPU) may determine a lower subtree of a structured tree of nodes of different levels of detail of the HLOD content needed for rendering. In block 1304, the component of the computing device (e.g., the CPU and/or the GPU) may request the lower subtree from a server without requesting intermediate subtrees. In some embodiments, the lower subtree level is greater than one lower level of detail removed from a current level of nodes available to the client computing device. Availability information may be split up at fixed/predictable locations in the structured HLOD data structure, such as a structured tree, and what subtrees may be needed to finalize traversal results where the availability isn't resident yet may be identified. What subtrees may be touched by partial traversal results may be identified and those subtrees that are several subtree levels deeper (or lower) that than the ones currently obtained may be requested.

In block 1306, the component of the computing device (e.g., the CPU and/or the GPU) may receive a dummy file in response to the lower subtree not existing at the server, the dummy file indicating the lower subtree does not yet exist at the server. In networked scenarios, requesting a lower subtree from a server without requesting intermediate subtrees may generate a lot of 404 errors since the subtree may not exist. One way around this may be to symlink to a dummy file for every non-existent subtree in the dataset.

Figure 14:
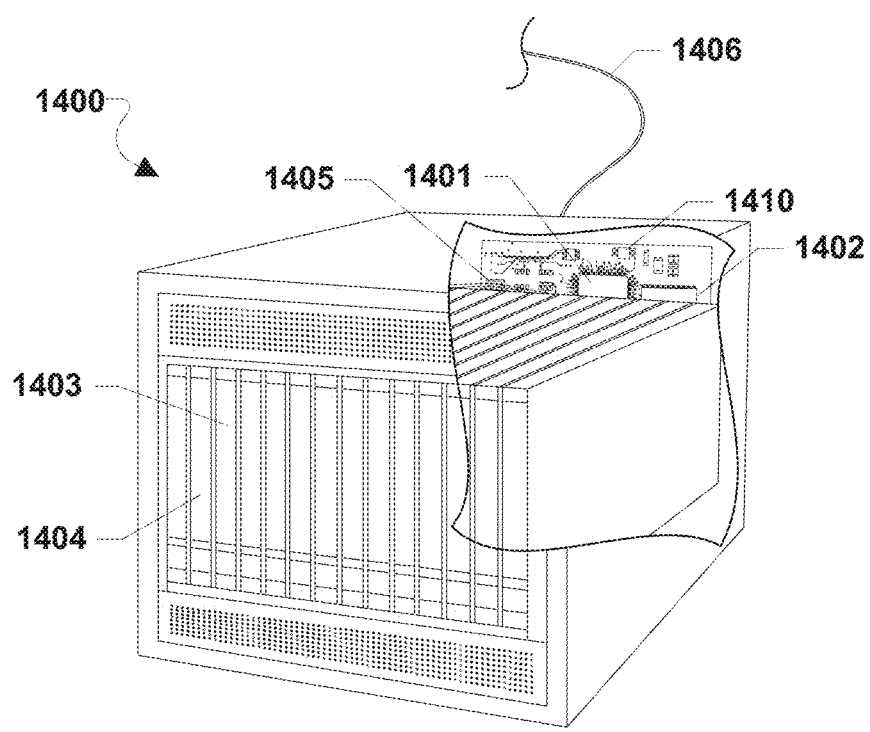
FIG. 14 is a component block diagram of a server that is a computing device suitable for use in the various embodiments.

The various embodiment methods may also be performed partially or completely on a variety of computing devices, such as a server. Such embodiments may be implemented on any of a variety of commercially available server devices, such as the server 1400 illustrated in FIG. 14. Such a server 1400 typically includes a one or more processors, such as a processor 1401 (e.g., a CPU) and a processor 1410 (e.g., a GPU), with one or more of the one or more processors coupled to internal memory 1402 (e.g., volatile memory) and a large capacity nonvolatile memory 1403, such as a disk drive. The one or more processors, such as a processor 1401 (e.g., a CPU) and a processor 1410 (e.g., a GPU), may be connected together and may exchange communications with one another. The server 1400 may also include a floppy disc drive, compact disc (CD) or DVD disc drive 1404 coupled to one or more of the one or more processors, such as a processor 1401 (e.g., a CPU) and a processor 1410 (e.g., a GPU). The server 1400 may also include network access ports 1405 coupled to one or more of the one or more processors, such as a processor 1401 (e.g., a CPU) and a processor 1410 (e.g., a GPU), for establishing data connections with a network 1406, such as a local area network coupled to other broadcast system computers and servers. The one or more processors, such as a processor 1401 (e.g., a CPU) and a processor 1410 (e.g., a GPU), may be any programmable microprocessor, microcomputer or multiple processor chip or chips that may be configured by software instructions (applications) to perform a variety of functions, including the functions of the various embodiments described above. Typically, software applications may be stored in the memory 1402, 1403 before they are accessed and loaded into one or more of the one or more processors, such as a processor 1401 (e.g., a CPU) and a processor 1410 (e.g., a GPU). The one or more processors, such as a processor 1401 (e.g., a CPU) and a processor 1410 (e.g., a GPU), may include internal memory sufficient to store the application software instructions.

Figure 15:
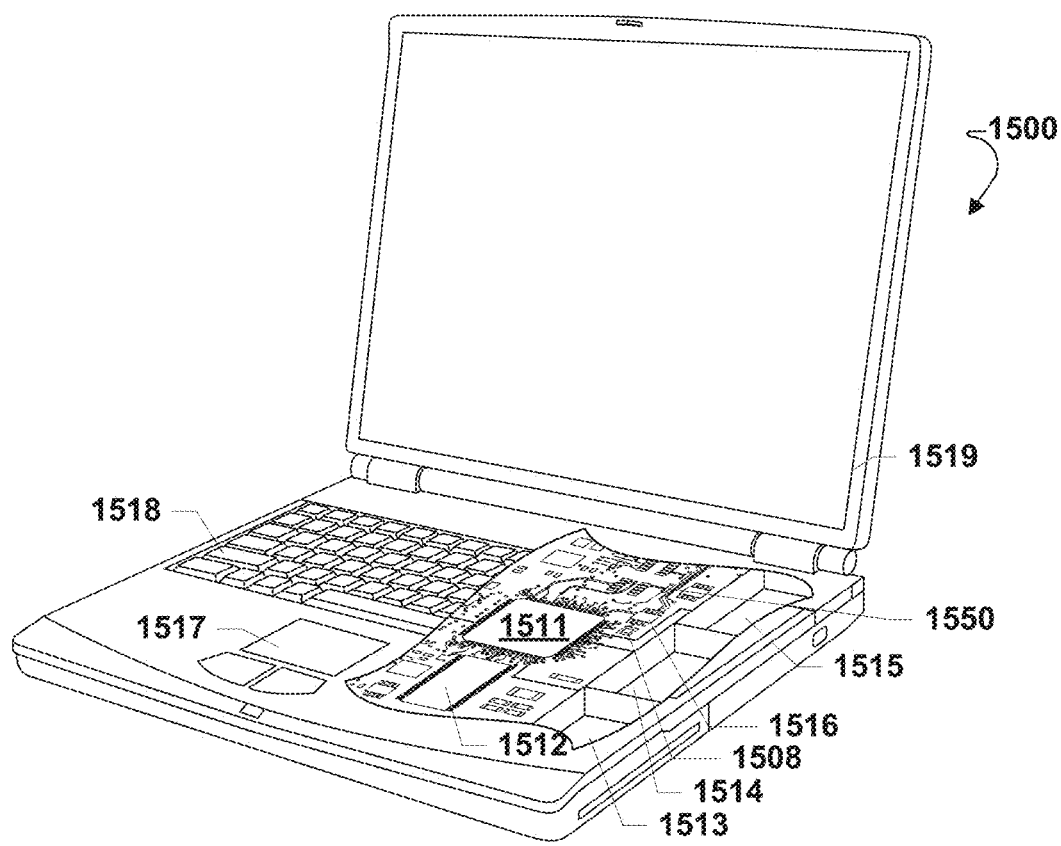
FIG. 15 is a component block diagram of a laptop that is a computing device suitable for use in the various embodiments.

The various embodiments described above may also be implemented within a variety of computing devices, such as a laptop computer 1500 illustrated in FIG. 15. Many laptop computers include a touchpad 1517 with touch surface that serves as the computer's pointing device, and thus may receive drag, scroll, and flick gestures similar to those implemented on mobile computing devices equipped with a touch screen display and described above. A laptop computer 1500 will typically include one or more processors, such as a processor 1511 (e.g., a CPU) and a processor 1550 (e.g., a GPU), and one or more of the one or more processors may be coupled to volatile memory 1512 and a large capacity nonvolatile memory, such as a disk drive 1513 of Flash memory. One or more of the one or more processors, such as a processor 1511 (e.g., a CPU) and a processor 1550 (e.g., a GPU), may be connected together and may exchange communications with one another. Additionally, the laptop computer 1500 may have one or more antennas 1508 for sending and receiving electromagnetic radiation that may be connected to a wireless data link and/or cellular telephone transceiver 1516 coupled to one or more of the one or more processors, such as a processor 1511 (e.g., a CPU) and a processor 1550 (e.g., a GPU). The laptop computer 1500 may also include a floppy disc drive 1514 and a compact disc (CD) drive 1515 coupled to one or more of the one or more processors, such as a processor 1511 (e.g., a CPU) and a processor 1550 (e.g., a GPU). In a notebook configuration, the computer housing includes the touchpad 1517, the keyboard 1518, and the display 1519 all coupled to one or more of the one or more processors, such as a processor 1511 (e.g., a CPU) and a processor 1550 (e.g., a GPU). Other configurations of the mobile computing device may include a computer mouse or trackball coupled to one or more of the one or more processors, such as a processor 1511 (e.g., a CPU) and a processor 1550 (e.g., a GPU), (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for traversing hierarchical level of detail (HLOD) content for rendering on a display of a client computing device, the method performed by the client computing device, the method comprising:
   receiving a metadata structure indicating a structured tree of nodes of different levels of detail of the HLOD content, the metadata structure received over a network from a server;
   generating an object space representation of at least one level of the structured tree of nodes of the HLOD content based at least in part on the metadata structure, wherein the generated object space representation is a neutral space where a primitive is centered at the origin and has no rotation or scaling applied such that operations are agnostic to bounds, rotation, or translation of the structured tree of nodes;
   transforming a current camera sphere for a view of the HLOD content to be rendered into an object space to create a camera object space ellipsoid;
   determining nodes of the at least one level of the structured tree of nodes of the HLOD content required for rendering based on a comparison of the generated object space representation and the camera object space ellipsoid, wherein determining nodes of the at least one level of the structured tree of nodes of the HLOD content required for rendering based on a comparison of the generated object space representation and the camera object space ellipsoid comprises:
      aligning a precomputed sampling skeleton of the current camera sphere in the object space with the generated object space representation at a current camera position;

determining the nodes of the at least one level of the structured tree of nodes of the HLOD content intersecting the sampling skeleton;

adjusting values of a first bit array in which each bit represents a node in a relative grid encasing the current camera sphere in the object space such that designated values indicate a node is determined to intersect the sampling skeleton; and requesting data for the determined nodes of the at least one level of the structured tree of nodes of the HLOD content from the server.

2. The method of claim 1, wherein the first bit array at least in part represents the determined nodes of the at least one level of the structured tree of nodes of the HLOD content to be requested from the server.

3. A method for traversing hierarchical level of detail (HLOD) content for rendering on a display of a client computing device, the method performed by the client computing device, the method comprising:

receiving a metadata structure indicating a structured tree of nodes of different levels of detail of the HLOD content, the metadata structure received over a network from a server;

generating an object space representation of at least one level of the structured tree of nodes of the HLOD content based at least in part on the metadata structure, wherein the generated object space representation is a neutral space where a primitive is centered at the origin and has no rotation or scaling applied such that operations are agnostic to bounds, rotation, or translation of the structured tree of nodes;

transforming a current camera sphere for a view of the HLOD content to be rendered into an object space to create a camera object space ellipsoid;

determining nodes of the at least one level of the structured tree of nodes of the HLOD content required for rendering based on a comparison of the generated object space representation and the camera object space ellipsoid, wherein determining nodes of the at least one level of the structured tree of nodes of the HLOD content required for rendering based on a comparison of the generated object space representation and the camera object space ellipsoid comprises:

aligning a precomputed sampling skeleton of the current camera sphere in the object space with the generated object space representation at a cell octant of a cell closest to a current camera position;

determining the nodes of the at least one level of the structured tree of nodes of the HLOD content intersecting the sampling skeleton;

adjusting values of a first bit array in which each bit represents a node in a relative grid encasing the current camera sphere in the object space such that designated values indicate a node is determined to intersect the sampling skeleton; and requesting data for the determined nodes of the at least one level of the structured tree of nodes of the HLOD content from the server.

4. The method of claim 3, wherein the first bit array at least in part represents the determined nodes of the at least one level of the structured tree of nodes of the HLOD content to be requested from the server.

5. A client computing device, comprising:

a display; and a processor connected to the display, the processor configured to perform operations comprising:

receiving a metadata structure indicating a structured tree of nodes of different levels of detail of hierarchical level of detail (HLOD) content, the metadata structure received over a network from a server, wherein the generated object space representation is a neutral space where a primitive is centered at the origin and has no rotation or scaling applied such that operations are agnostic to bounds, rotation, or translation of the structured tree of nodes;

generating an object space representation of at least one level of the structured tree of nodes of the HLOD content based at least in part on the metadata structure;

transforming a current camera sphere for a view of the HLOD content to be rendered into an object space to create a camera object space ellipsoid;

determining nodes of the at least one level of the structured tree of nodes of the HLOD content required for rendering based on a comparison of the generated object space representation and the camera object space ellipsoid, wherein determining nodes of the at least one level of the structured tree of nodes of the HLOD content required for rendering based on a comparison of the generated object space representation and the camera object space ellipsoid comprises:

aligning a precomputed sampling skeleton of the current camera sphere in the object space with the generated object space representation at a current camera position;

determining the nodes of the at least one level of the structured tree of nodes of the HLOD content intersecting the sampling skeleton;

adjusting values of a first bit array in which each bit represents a node in a relative grid encasing the current camera sphere in the object space such that designated values indicate a node is determined to intersect the sampling skeleton; and requesting data for the determined nodes of the at least one level of the structured tree of nodes of the HLOD content from the server.

6. The client computing device of claim 5, wherein the first bit array at least in part represents the determined nodes of the at least one level of the structured tree of nodes of the HLOD content to be requested from the server.

7. A client computing device, comprising:

a display; and a processor connected to the display, the processor configured to perform operations comprising:

receiving a metadata structure indicating a structured tree of nodes of different levels of detail of hierarchical level of detail (HLOD) content, the metadata structure received over a network from a server, wherein the generated object space representation is a neutral space where a primitive is centered at the origin and has no rotation or scaling applied such that operations are agnostic to bounds, rotation, or translation of the structured tree of nodes;

generating an object space representation of at least one level of the structured tree of nodes of the HLOD content based at least in part on the metadata structure;

transforming a current camera sphere for a view of the HLOD content to be rendered into an object space to create a camera object space ellipsoid;

determining nodes of the at least one level of the structured tree of nodes of the HLOD content required for rendering based on a comparison of the generated object space representation and the camera object space ellipsoid, wherein determining nodes of the at least one level of the structured tree of nodes of the HLOD content required for rendering based on a comparison of the generated object space representation and the camera object space ellipsoid comprises:

aligning a precomputed sampling skeleton of the current camera sphere in the object space with the generated object space representation at a cell octant of a cell closest to a current camera position;

determining the nodes of the at least one level of the structured tree of nodes of the HLOD content intersecting the sampling skeleton;

adjusting values of a first bit array in which each bit represents a node in a relative grid encasing the current camera sphere in the object space such that designated values indicate a node is determined to intersect the sampling skeleton; and requesting data for the determined nodes of the at least one level of the structured tree of nodes of the HLOD content from the server.

8. The client computing device of claim 7, wherein the first bit array at least in part represents the determined nodes of the at least one level of the structured tree of nodes of the HLOD content to be requested from the server.

* * * * *